Dec. 18, 1928.  
H. H. TRENT  
1,695,724
FOLDING HANDLE FOR FRYING PANS AND THE LIKE
Filed Jan. 31, 1928
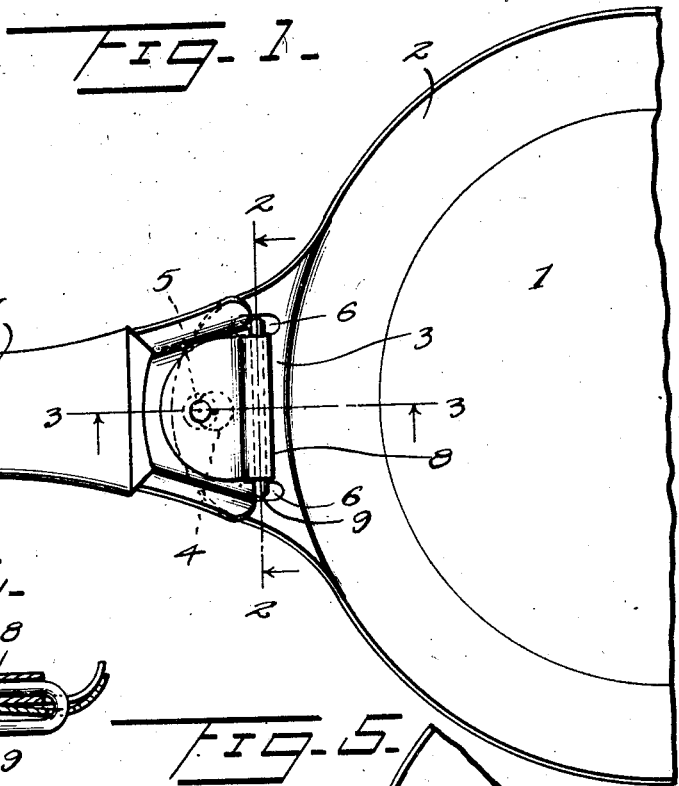
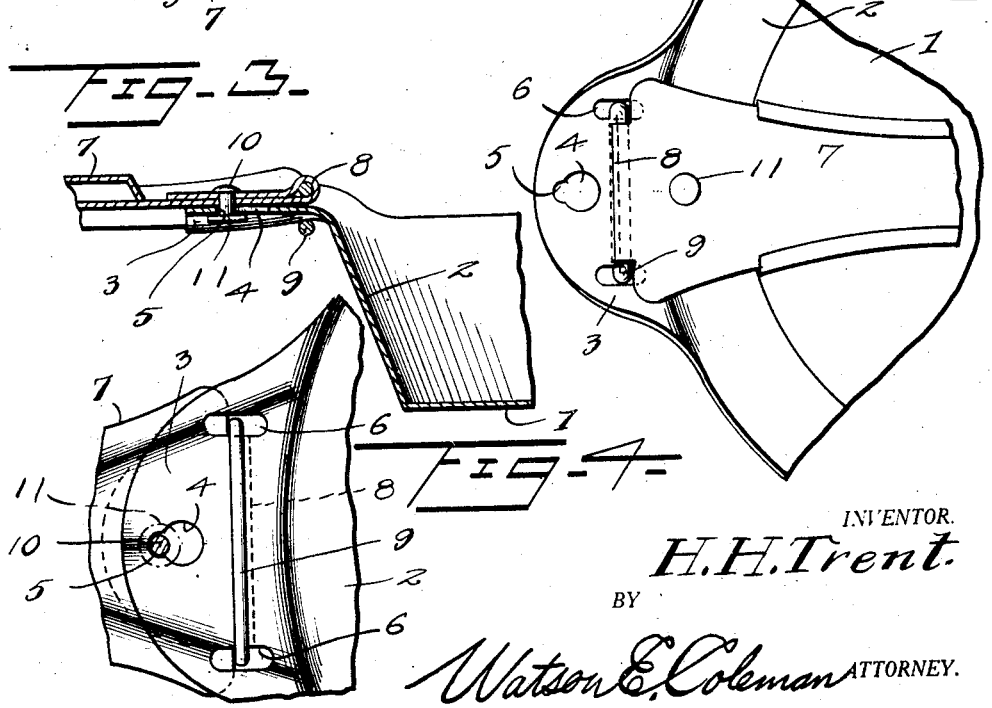
INVENTOR.  
H. H. Trent.  
BY  
Watson E. Coleman ATTORNEY.

Patented Dec. 18, 1928.

1,695,724

UNITED STATES PATENT OFFICE.

HARLEY H. TRENT, OF BOZEMAN, MONTANA.

FOLDING HANDLE FOR FRYING PANS AND THE LIKE.

Application filed January 31, 1928. Serial No. 250,905.

This invention relates to a folding handle adapted to be used upon cooking utensils and more particularly for frying pans, and it consists in the novel features hereinafter described and claimed.

An object of the invention is to provide a foldable handle adapted to be applied to the pan bowl and having its parts and features so arranged and assembled that the grip portion of the handle may be folded over the bowl in order that the structure may take up but little space in storage or during transportation.

A further object of the invention is to provide simple and efficient means for holding the handle grip at an extended position with relation to the pan bowl so that the parts are rigidly connected together when the pan is in use.

In the accompanying drawing, Figure 1 is a fragmentary plan view of a utensil with the folding handle applied thereto, Fig. 2 is a transverse sectional view cut on the line 2—2 of Fig. 1, Fig. 3 is a fragmentary sectional view cut on the line 3—3 of Fig. 1, Fig. 4 is an enlarged fragmentary view of the under portion of the utensil with the handle and showing parts in section, Fig. 5 is a fragmentary plan view indicating the position of the parts when the handle is folded with relation to the utensil.

As illustrated in the accompanying drawing, the pan bowl 1 is provided at its edge with the usual flange 2 and the said flange is provided at its upper edge and at one side of the bowl with an outstanding lip 3. The lip 3 is provided at a point approximately midway between its side edges with a circular opening 4 having at one side a recess 5. The lip 3 is provided at the opposite sides of the opening 4 with elongated openings 6.

The body of the handle grip 7 is preferably formed of sheet metal and one end portion of the handle grip is folded over upon itself forming a curl 8 which receives one side of a loop 9. The ends of the loop 9 pass through the elongated openings 6 of the lip 3 and the opposite side portion of the loop 9 bridges the space between the openings 6 and lies against the under surface of the lip 3. The free end portion of the curl 8 is secured to the body of the handle grip 7 by means of a stud 10, said stud having a head 11 adapted to pass through the opening 4 of the lip 3 and the shank of the stud is adapted to enter the recess 5 whereby the portions of the lip 3 lying adjacent the opposite edges of the recess 5 are carried between the head 11 and the under surface of the handle grip 7 when the said handle grip is moved longitudinally with relation to the lip 3. Thus means are provided for temporarily holding the handle grip at a fixed position with relation to the lip. When it is desired to fold the handle grip over the pan bowl, the grip is first slipped longitudinally toward the center of the bowl and over the upper surface of the lip 3. When the head 11 of the stud 10 comes into register with the opening 4, the handle grip is swung over the pan bowl and disposed transversely thereof. Thus the parts are compactly assembled and the utensil may be conveniently stored and packed. The key-hole opening provided at 4, 5 affords a convenient means for suspending the pan when arranged upon a support. By use of a headed support, the head of which is of such size that it will just pass through the opening 4, all likelihood of the pan falling from the support is avoided.

From the foregoing description taken in connection with the accompanying drawings, it will be seen that a foldable handle of simple and durable structure is provided and that the same may be economically used upon a frying pan or similar utensil.

I claim:

1. In combination with a pan bowl having a lip provided with an opening having at its side a recess and having elongated openings disposed at the opposite sides of the first mentioned opening, a handle, a loop pivotally connected with the handle and passing through the last mentioned openings and a stud carried by the handle and adapted to pass through the first mentioned opening and having a shank adapted to enter the recess thereof.

2. In combination with a pan bowl having a lip provided with an opening having at its side a recess and with elongated openings located at the opposite sides thereof, a loop having end portions passing through the elongated openings and having one side bridging the space between said openings, a handle pivotally connected with the opposite side of the loop and a stud carried by the handle and adapted to pass through the first mentioned opening.

3. In combination with a pan bowl having a lip provided with an opening having a recess at the side thereof, and elongated openings disposed beyond the opposite sides thereof, a loop having end portions passing through the elongated openings and a side portion bridging the space between them, a handle grip having at its end a curled portion which extends around the opposite side of the loop, a stud securing the curled portion to the body of the handle grip and having a head adapted to pass through the first mentioned opening and the shank of the said stud adapted to enter the recess thereof.

4. In a cooking utensil, a handle, means providing a sliding and swinging connection between the handle and utensil, and means for latching the handle in operative position upon shifting the same transversely of the utensil.

5. In a cooking utensil, a handle, a pivotal connection between the handle and utensil permitting movement of the handle transversely thereof, and coacting means between the handle and utensil acting when the handle is in operative position and shifted transversely of the utensil, to latch the handle in position.

6. In a cooking utensil, a handle, means permanently connecting the handle to the utensil for permitting vertical swinging movement and movement transversely of the utensil, and means acting upon arranging the handle in operative position and shifting it transversely of the pan to secure it in such position.

7. In a cooking utensil, a handle, a hinge connection between one end of the handle and the utensil designed to permit restricted movement of the handle transversely thereof, and means carried by the handle for engaging the utensil to hold the handle in operative position, such engaging action taking place upon the shifting of the handle in a direction transverse to the utensil.

In testimony whereof I hereunto affix my signature.

HARLEY H. TRENT.